US008150003B1

(12) United States Patent
Coughlan et al.

(10) Patent No.: US 8,150,003 B1
(45) Date of Patent: Apr. 3, 2012

(54) CALLER INITIATED UNDIVERT FROM VOICEMAIL

(75) Inventors: Marc Coughlan, NSW (AU); Alexander Forbes, NSW (AU); Ciaran Gannon, NSW (AU); Peter D. Runcie, NSW (AU); Alexander Scholte, NSW (AU)

(73) Assignee: Avaya Inc., Basking Ridge, NJ (US)

( * ) Notice: Subject to any disclaimer, the term of this patent is extended or adjusted under 35 U.S.C. 154(b) by 1213 days.

(21) Appl. No.: 11/626,217

(22) Filed: Jan. 23, 2007

(51) Int. Cl.
H04M 1/64 (2006.01)
H04L 12/66 (2006.01)

(52) U.S. Cl. ............ 379/88.22; 370/312; 370/352; 379/88.17; 379/201.01; 379/210.02; 379/211.01; 379/220.01; 455/459; 455/466

(58) Field of Classification Search ............ 370/312, 370/352; 379/88.17, 88.19, 88.22, 88.23, 379/201.01, 201.07, 207.04, 211.01, 211.02, 379/215.01, 221.01, 88.21, 142.06, 210.02, 379/220.01; 455/459, 466
See application file for complete search history.

(56) References Cited

U.S. PATENT DOCUMENTS

| 4,809,272 A | 2/1989 | Torgrim et al. |
| 4,817,130 A | 3/1989 | Frimmel, Jr. |
| 4,941,168 A | 7/1990 | Kelly, Jr. |
| 5,001,710 A | 3/1991 | Gawrys et al. |
| 5,003,577 A | 3/1991 | Ertz et al. |
| 5,007,076 A * | 4/1991 | Blakley ................ 379/88.21 |
| 5,153,905 A | 10/1992 | Bergeron et al. |
| 5,185,782 A | 2/1993 | Srinivasan |
| 5,206,903 A | 4/1993 | Kohler et al. |
| 5,311,588 A | 5/1994 | Polcyn et al. |
| 5,313,515 A | 5/1994 | Allen et al. |
| 5,329,578 A | 7/1994 | Brennan et al. |
| 5,341,414 A | 8/1994 | Popke |
| 5,371,534 A | 12/1994 | Dagdeviren et al. |
| 5,371,787 A | 12/1994 | Hamilton |
| 5,396,542 A | 3/1995 | Alger et al. |
| 5,410,343 A | 4/1995 | Coddington et al. |
| 5,430,792 A | 7/1995 | Jesurum et al. |
| 5,434,908 A | 7/1995 | Klein |
| 5,493,692 A | 2/1996 | Theimer et al. |

(Continued)

FOREIGN PATENT DOCUMENTS

EP 0 886 416 12/1998

(Continued)

OTHER PUBLICATIONS

Okuyama et al., "Instant Message Technique for Supporting New Mobile Service", Fuzitsu, Fuzitsu Inc., Jul. 13, 2001, vol. 52, the fourth number, pp. 262-267 (translated abstract).

(Continued)

*Primary Examiner* — Gerald Gauthier
(74) *Attorney, Agent, or Firm* — Sheridan Ross P.C.

(57) ABSTRACT

Once a voicemail is received, it is the onus of the recipient of the voicemail message to call the caller back when a "missed call" message is received on the phone or after the voicemail message is retrieved. While some of the more advanced voicemail systems provide the capability of automatically placing a call from the callee back to the caller upon completion of the callee listening to the voicemail message, an exemplary embodiment of the present invention allows the caller to be connected to the callee should the callee become available while the caller is leaving a voicemail message for the callee.

26 Claims, 3 Drawing Sheets

U.S. PATENT DOCUMENTS

| | | | |
|---|---|---|---|
| 5,511,112 A | 4/1996 | Szlam | |
| 5,533,103 A | 7/1996 | Peavey et al. | |
| 5,555,376 A | 9/1996 | Theimer et al. | |
| 5,590,178 A | 12/1996 | Murakami et al. | |
| 5,675,639 A | 10/1997 | Itani | |
| 5,706,329 A * | 1/1998 | Foladare et al. | 455/459 |
| 5,712,902 A | 1/1998 | Florence et al. | |
| 5,724,420 A | 3/1998 | Torgrim | |
| 5,742,763 A | 4/1998 | Jones | |
| 5,802,510 A | 9/1998 | Jones | |
| 5,805,587 A | 9/1998 | Norris et al. | |
| 5,819,084 A | 10/1998 | Shapiro et al. | |
| 5,826,039 A | 10/1998 | Jones | |
| 5,828,731 A | 10/1998 | Szlam et al. | |
| 5,828,747 A | 10/1998 | Fisher et al. | |
| 5,864,874 A | 1/1999 | Shapiro | |
| 5,894,504 A | 4/1999 | Alfred et al. | |
| 5,903,726 A | 5/1999 | Donovan et al. | |
| 5,905,793 A | 5/1999 | Flockhart et al. | |
| 5,982,873 A | 11/1999 | Flockhart et al. | |
| 5,999,611 A | 12/1999 | Tatchell et al. | |
| 6,018,655 A | 1/2000 | Bartle et al. | |
| 6,031,896 A | 2/2000 | Gardell et al. | |
| 6,038,296 A | 3/2000 | Brunson et al. | |
| 6,046,762 A | 4/2000 | Sonesh et al. | |
| 6,068,188 A | 5/2000 | Knowles | |
| 6,088,441 A | 7/2000 | Flockhart et al. | |
| 6,094,681 A | 7/2000 | Shaffer et al. | |
| 6,128,304 A | 10/2000 | Gardell et al. | |
| 6,130,937 A | 10/2000 | Fotta | |
| 6,144,644 A | 11/2000 | Bajzath et al. | |
| 6,154,738 A | 11/2000 | Call | |
| 6,163,607 A | 12/2000 | Bogart et al. | |
| 6,167,266 A | 12/2000 | Havinis et al. | |
| 6,169,795 B1 | 1/2001 | Dunn et al. | |
| 6,173,053 B1 | 1/2001 | Bogart et al. | |
| 6,185,603 B1 | 2/2001 | Henderson et al. | |
| 6,188,756 B1 | 2/2001 | Mashinsky | |
| 6,192,122 B1 | 2/2001 | Flockhart et al. | |
| 6,199,048 B1 | 3/2001 | Hudetz et al. | |
| 6,208,870 B1 | 3/2001 | Lorello et al. | |
| 6,208,970 B1 | 3/2001 | Ramanan | |
| 6,212,265 B1 | 4/2001 | Duphorne | |
| 6,215,784 B1 | 4/2001 | Petras et al. | |
| 6,226,360 B1 | 5/2001 | Goldberg et al. | |
| 6,272,319 B1 | 8/2001 | Narusawa | |
| 6,282,284 B1 | 8/2001 | Dezonno et al. | |
| 6,298,062 B1 | 10/2001 | Gardell et al. | |
| 6,301,609 B1 | 10/2001 | Aravamudan et al. | |
| 6,307,931 B1 | 10/2001 | Vaudreuil | |
| 6,310,947 B1 | 10/2001 | Polcyn | |
| 6,311,231 B1 | 10/2001 | Bateman et al. | |
| 6,317,593 B1 | 11/2001 | Vossler | |
| 6,330,243 B1 | 12/2001 | Strandberg | |
| 6,330,317 B1 | 12/2001 | Garfinkel | |
| 6,332,081 B1 | 12/2001 | Do | |
| 6,332,154 B2 | 12/2001 | Beck et al. | |
| 6,360,222 B1 | 3/2002 | Quinn | |
| 6,408,177 B1 | 6/2002 | Parikh et al. | |
| 6,411,682 B1 | 6/2002 | Fuller et al. | |
| 6,430,271 B1 | 8/2002 | DeJesus et al. | |
| 6,430,602 B1 | 8/2002 | Kay et al. | |
| 6,430,604 B1 | 8/2002 | Ogle et al. | |
| 6,449,260 B1 | 9/2002 | Sassin et al. | |
| 6,456,711 B1 | 9/2002 | Cheung et al. | |
| 6,463,299 B1 | 10/2002 | Macor | |
| 6,463,471 B1 | 10/2002 | Dreke et al. | |
| 6,477,270 B1 | 11/2002 | Wu | |
| 6,477,373 B1 | 11/2002 | Rappaport et al. | |
| 6,477,374 B1 | 11/2002 | Shaffer et al. | |
| 6,480,484 B2 | 11/2002 | Morton | |
| 6,535,600 B1 | 3/2003 | Fisher et al. | |
| 6,546,097 B1 | 4/2003 | Peltz | |
| 6,549,612 B2 | 4/2003 | Gifford et al. | |
| 6,560,318 B1 | 5/2003 | Spielman et al. | |
| 6,561,805 B2 | 5/2003 | Kumar | |
| 6,587,681 B1 | 7/2003 | Sawai | |
| 6,614,783 B1 | 9/2003 | Sonesh et al. | |
| 6,636,587 B1 | 10/2003 | Nagai et al. | |
| 6,643,360 B1 | 11/2003 | Reine | |
| 6,658,095 B1 | 12/2003 | Yoakum et al. | |
| 6,665,534 B1 | 12/2003 | Conklin et al. | |
| 6,668,167 B2 | 12/2003 | McDowell et al. | |
| 6,675,168 B2 | 1/2004 | Shapiro et al. | |
| 6,700,967 B2 | 3/2004 | Kleinoder et al. | |
| 6,707,890 B1 | 3/2004 | Gao et al. | |
| 6,738,462 B1 | 5/2004 | Brunson | |
| 6,741,586 B1 | 5/2004 | Schuster et al. | |
| 6,750,897 B1 | 6/2004 | Moshrefi et al. | |
| 6,751,453 B2 | 6/2004 | Schemers et al. | |
| 6,751,459 B1 | 6/2004 | Lee et al. | |
| 6,788,773 B1 | 9/2004 | Fotta | |
| 6,789,120 B1 | 9/2004 | Lee et al. | |
| 6,795,429 B1 | 9/2004 | Schuster et al. | |
| 6,807,423 B1 | 10/2004 | Armstrong et al. | |
| 6,839,735 B2 | 1/2005 | Wong et al. | |
| 6,865,384 B2 | 3/2005 | Sagi et al. | |
| 6,868,140 B2 | 3/2005 | Myers et al. | |
| 6,868,395 B1 | 3/2005 | Szlam et al. | |
| 6,871,062 B2 | 3/2005 | Trop et al. | |
| 6,879,677 B2 | 4/2005 | Trandal et al. | |
| 6,879,828 B2 | 4/2005 | Virtanen et al. | |
| 6,888,927 B1 | 5/2005 | Cruickshank et al. | |
| 6,891,933 B2 | 5/2005 | Kumamoto | |
| 6,891,934 B1 | 5/2005 | Gao et al. | |
| 6,925,166 B1 | 8/2005 | Chan | |
| 6,937,597 B1 | 8/2005 | Rosenberg et al. | |
| 6,968,052 B2 | 11/2005 | Wullert, II | |
| 6,968,179 B1 | 11/2005 | De Vries | |
| 6,987,765 B2 | 1/2006 | March et al. | |
| 6,988,126 B2 | 1/2006 | Wilcock et al. | |
| 6,999,731 B2 | 2/2006 | Cronin | |
| 7,003,087 B2 * | 2/2006 | Spencer et al. | 379/211.01 |
| 7,020,480 B2 | 3/2006 | Coskun et al. | |
| 7,023,971 B1 | 4/2006 | Huart et al. | |
| 7,023,980 B2 | 4/2006 | Lenard | |
| 7,027,586 B2 | 4/2006 | Bushey et al. | |
| 7,035,385 B2 * | 4/2006 | Levine et al. | 379/88.23 |
| 7,039,040 B1 | 5/2006 | Burg | |
| 7,054,939 B2 | 5/2006 | Koch et al. | |
| 7,058,036 B1 | 6/2006 | Yu et al. | |
| 7,068,762 B2 | 6/2006 | Skladman et al. | |
| 7,074,853 B2 | 7/2006 | Smith et al. | |
| 7,080,321 B2 | 7/2006 | Aleksander et al. | |
| 7,092,370 B2 | 8/2006 | Jiang et al. | |
| 7,099,867 B2 | 8/2006 | Okada et al. | |
| 7,103,155 B2 | 9/2006 | Caharel et al. | |
| 7,123,697 B2 * | 10/2006 | Amir et al. | 379/88.17 |
| 7,130,390 B2 | 10/2006 | Abburi | |
| 7,158,630 B2 | 1/2007 | Fotta et al. | |
| 7,171,473 B1 | 1/2007 | Eftis et al. | |
| 7,192,235 B2 | 3/2007 | Blight et al. | |
| 7,218,626 B2 | 5/2007 | Shaheen et al. | |
| 7,245,713 B1 * | 7/2007 | Simpson et al. | 379/221.01 |
| 7,248,677 B2 | 7/2007 | Randall et al. | |
| 7,269,162 B1 | 9/2007 | Turner | |
| 7,269,247 B2 | 9/2007 | Mashinsky | |
| 7,283,808 B2 | 10/2007 | Castell et al. | |
| 7,287,056 B2 | 10/2007 | Loveland et al. | |
| 7,313,617 B2 | 12/2007 | Malik et al. | |
| 7,340,246 B1 | 3/2008 | Kanerva et al. | |
| 7,356,137 B1 | 4/2008 | Burg et al. | |
| 7,359,496 B2 * | 4/2008 | Qian et al. | 379/201.07 |
| 7,398,061 B2 | 7/2008 | Mousseau | |
| 7,436,939 B1 | 10/2008 | Packingham et al. | |
| 7,436,945 B2 * | 10/2008 | Agrawal et al. | 379/211.02 |
| 7,437,162 B1 | 10/2008 | Zhang et al. | |
| 7,487,095 B2 | 2/2009 | Hill et al. | |
| 7,492,872 B1 | 2/2009 | Di Carlo et al. | |
| 7,542,558 B2 * | 6/2009 | Klein et al. | 379/201.01 |
| 7,602,895 B2 * | 10/2009 | Terry et al. | 379/215.01 |
| 7,609,663 B2 * | 10/2009 | Neuhaus et al. | 370/312 |
| 2001/0006893 A1 | 7/2001 | Yoshioka | |
| 2001/0012286 A1 | 8/2001 | Huna et al. | |
| 2001/0029176 A1 | 10/2001 | Taniguchi | |
| 2002/0019829 A1 | 2/2002 | Shapiro | |
| 2002/0021307 A1 | 2/2002 | Glenn et al. | |

| | | |
|---|---|---|
| 2002/0024958 A1 | 2/2002 | Iveland et al. |
| 2002/0032040 A1 | 3/2002 | Tsukamoto |
| 2002/0035605 A1 | 3/2002 | McDowell et al. |
| 2002/0052225 A1 | 5/2002 | Davis et al. |
| 2002/0055350 A1 | 5/2002 | Gupte et al. |
| 2002/0055975 A1 | 5/2002 | Petroyikh |
| 2002/0065894 A1 | 5/2002 | Dalai et al. |
| 2002/0069081 A1 | 6/2002 | Ingram et al. |
| 2002/0076010 A1 | 6/2002 | Sahal |
| 2002/0076025 A1 | 6/2002 | Liversidge et al. |
| 2002/0082931 A1 | 6/2002 | Siegel et al. |
| 2002/0083127 A1 | 6/2002 | Agrawal |
| 2002/0085701 A1 | 7/2002 | Parsons et al. |
| 2002/0087630 A1 | 7/2002 | Wu |
| 2002/0098831 A1 | 7/2002 | Castell et al. |
| 2002/0116336 A1 | 8/2002 | Diacakis et al. |
| 2002/0116461 A1 | 8/2002 | Diacakis et al. |
| 2002/0120687 A1 | 8/2002 | Diacakis et al. |
| 2002/0126701 A1 | 9/2002 | Requena |
| 2002/0131395 A1 | 9/2002 | Wang |
| 2002/0160757 A1 | 10/2002 | Shavit et al. |
| 2002/0176558 A1 | 11/2002 | Tate et al. |
| 2003/0014491 A1 | 1/2003 | Horvitz et al. |
| 2003/0018720 A1 | 1/2003 | Chang et al. |
| 2003/0026289 A1 | 2/2003 | Mukherjee et al. |
| 2003/0028597 A1 | 2/2003 | Salmi et al. |
| 2003/0028621 A1 | 2/2003 | Furlong et al. |
| 2003/0037103 A1 | 2/2003 | Salmi et al. |
| 2003/0041101 A1 | 2/2003 | Hansche et al. |
| 2003/0065788 A1 | 4/2003 | Salomaki |
| 2003/0073440 A1 | 4/2003 | Mukhegee et al. |
| 2003/0086390 A1 | 5/2003 | Eschbach et al. |
| 2003/0110228 A1 | 6/2003 | Xu et al. |
| 2003/0110292 A1 | 6/2003 | Takeda et al. |
| 2003/0112952 A1* | 6/2003 | Brown et al. ............ 379/211.01 |
| 2003/0115332 A1 | 6/2003 | Honeisen |
| 2003/0130864 A1 | 7/2003 | Ho et al. |
| 2003/0135569 A1 | 7/2003 | Khakoo et al. |
| 2003/0148756 A1 | 8/2003 | Onishi et al. |
| 2003/0154251 A1 | 8/2003 | Manabe et al. |
| 2003/0154293 A1 | 8/2003 | Zmolek |
| 2003/0191762 A1 | 10/2003 | Kalliokulju et al. |
| 2003/0195811 A1 | 10/2003 | Hayes et al. |
| 2003/0217142 A1 | 11/2003 | Bobde et al. |
| 2003/0233415 A1 | 12/2003 | Beyda |
| 2004/0010431 A1 | 1/2004 | Thomas et al. |
| 2004/0062383 A1 | 4/2004 | Sylvain |
| 2004/0078445 A1 | 4/2004 | Malik |
| 2004/0086094 A1 | 5/2004 | Bosik et al. |
| 2004/0120498 A1 | 6/2004 | Sylvain |
| 2004/0133641 A1 | 7/2004 | McKinnon et al. |
| 2004/0136505 A1 | 7/2004 | Garg et al. |
| 2004/0141594 A1 | 7/2004 | Brunson |
| 2004/0156493 A1* | 8/2004 | Cohen ...................... 379/207.04 |
| 2004/0189698 A1 | 9/2004 | Bokish |
| 2004/0198427 A1 | 10/2004 | Kimbell et al. |
| 2005/0025295 A1* | 2/2005 | Christie, IV ............... 379/88.19 |
| 2005/0031107 A1 | 2/2005 | Fotta |
| 2005/0054361 A1 | 3/2005 | Turcanu et al. |
| 2005/0071642 A1 | 3/2005 | Moghe et al. |
| 2005/0114159 A1 | 5/2005 | Ozugur et al. |
| 2005/0147086 A1 | 7/2005 | Rosenberg et al. |
| 2005/0163104 A1 | 7/2005 | Christensen et al. |
| 2005/0165894 A1 | 7/2005 | Rosenberg et al. |
| 2005/0165934 A1 | 7/2005 | Rosenberg et al. |
| 2005/0187781 A1 | 8/2005 | Christensen et al. |
| 2005/0198299 A1 | 9/2005 | Beck et al. |
| 2005/0207361 A1 | 9/2005 | Rosenberg et al. |
| 2005/0210104 A1 | 9/2005 | Torvinen |
| 2005/0216565 A1 | 9/2005 | Ito et al. |
| 2005/0216848 A1 | 9/2005 | Thompson et al. |
| 2005/0221807 A1 | 10/2005 | Karlsson et al. |
| 2005/0226403 A1 | 10/2005 | Lenard |
| 2005/0233776 A1 | 10/2005 | Allen et al. |
| 2005/0267895 A1 | 12/2005 | Yoshiuchi et al. |
| 2005/0276407 A1 | 12/2005 | Mohler |
| 2006/0013233 A1 | 1/2006 | Trossen et al. |
| 2006/0167998 A1 | 7/2006 | Yoshiuchi et al. |
| 2006/0248184 A1 | 11/2006 | Wu et al. |
| 2006/0252444 A1 | 11/2006 | Ozugur |
| 2007/0067443 A1 | 3/2007 | Seligmann et al. |
| 2007/0087731 A1 | 4/2007 | Karlsson et al. |
| 2007/0106756 A1 | 5/2007 | Eftis et al. |
| 2007/0112965 A1 | 5/2007 | Eftis et al. |
| 2007/0112966 A1 | 5/2007 | Eftis et al. |
| 2007/0237130 A1* | 10/2007 | Milstein et al. ............... 370/352 |
| 2007/0274466 A1* | 11/2007 | Tidwell et al. ............... 379/67.1 |
| 2008/0019300 A1 | 1/2008 | Perzy et al. |
| 2008/0040441 A1 | 2/2008 | Maes |
| 2008/0049911 A1* | 2/2008 | Hanson et al. ............. 379/88.22 |
| 2008/0089488 A1 | 4/2008 | Brunson et al. |
| 2008/0152109 A1* | 6/2008 | Bartfeld et al. .......... 379/142.06 |
| 2009/0225972 A1* | 9/2009 | Kahn ....................... 379/210.02 |

FOREIGN PATENT DOCUMENTS

| | | |
|---|---|---|
| EP | 0930592 | 7/1999 |
| EP | 1259053 | 11/2002 |
| EP | 1261179 | 11/2002 |
| JP | 05-260188 | 10/1993 |
| JP | H8-23577 | 1/1996 |
| JP | 9-200813 | 7/1997 |
| JP | H11-046377 | 2/1999 |
| JP | 11-088495 | 3/1999 |
| JP | H11-187454 | 7/1999 |
| JP | H11-205837 | 7/1999 |
| JP | 2000-102059 | 4/2000 |
| JP | 2000-312258 | 11/2000 |
| JP | 2001-189774 | 7/2001 |
| JP | 2001-224075 | 8/2001 |
| JP | 2001-251395 | 9/2001 |
| JP | 2001-251682 | 9/2001 |
| JP | 2001-350782 | 12/2001 |
| JP | 2002-094614 | 3/2002 |
| JP | 2002-101155 | 4/2002 |
| JP | 2002-108794 | 4/2002 |
| JP | 2002-152335 | 5/2002 |
| JP | 2002-176449 | 6/2002 |
| JP | 2003-8655 | 1/2003 |
| JP | 2003-116175 | 4/2003 |
| JP | 2003-517781 | 5/2003 |
| JP | 2003-169147 | 6/2003 |
| JP | 2003-196469 | 7/2003 |
| JP | 2003-296556 | 10/2003 |
| JP | 2004-013303 | 1/2004 |
| JP | 2004-30371 | 1/2004 |
| WO | WO 97/24010 | 7/1997 |
| WO | WO 98/03923 | 1/1998 |
| WO | WO 98/12644 | 3/1998 |
| WO | WO 00/39964 | 7/2000 |
| WO | WO 00/69140 | 11/2000 |
| WO | WO 01/45368 | 6/2001 |
| WO | WO 01/55915 | 8/2001 |
| WO | WO 01/69387 | 9/2001 |
| WO | WO 01/71925 | 9/2001 |
| WO | WO 02/30105 | 4/2002 |
| WO | WO 02/093959 | 11/2002 |
| WO | WO 03/025776 | 3/2003 |
| WO | WO 03/054717 | 7/2003 |
| WO | WO 03/096559 | 11/2003 |
| WO | WO 03/085539 | 10/2006 |

OTHER PUBLICATIONS

U.S. Appl. No. 12/147,355, filed Jun. 26, 2008, Craft et al.
U.S. Appl. No. 12/242,103, filed Sep. 30, 2008, Zmolek.
U.S. Appl. No. 12/242,432, filed Sep. 30, 2008, Brunson et al.
U.S. Appl. No. 12/242,458, filed Sep. 30, 2008, Brunson et al.
U.S. Appl. No. 12/242,484, filed Sep. 30, 2008, Brunson et al.
U.S. Appl. No. 12/242,504, filed Sep. 30, 2008, Brunson et al.
U.S. Appl. No. 12/242,538, filed Sep. 30, 2008, Brunson et al.
U.S. Appl. No. 12/243,009, filed Sep. 30, 2008, Brunson et al.
Background of the above-captioned application (previously provided).
U.S. Appl. No. 10/865,114, Craft.
U.S. Appl. No. 11/542,295, Somani.
U.S. Appl. No. 11/621,350, Lenard.
U.S. Appl. No. 11/549,448, Brunson et al.

Andy Zmolek; "Simple and Presence: Enterprise Value Propositions," Avaya presentation, 16 pages, presented Jan. 24, 2002.

Atkins et al "Common Presence and Instant Messaging: Message Format," Network Working Group (Jan. 9, 2003), available at http://www.ietf.internet-drafts/draft-ietf-impp-cpim-msgfmt-06.txt, 31 pages.

Berners-Lee et al.; "Uniform Resource Identifiers (URI); Generic Syntax," Network Working Group, Request for Comments 2396 (Aug. 1998), 38 pages.

Bill Michael, The Politics of Naming www.cConvergence.com (Jul. 2001) pp. 31-35.

CC News: Call Center Technology, "FaceTime gives voice, vision to instant messaging", available at http://www.ccnews.com/may2000/depts/cct/cctstory2.htm, 2 pages; Copyright 2000, 1999.

Chavez et al., "Interactive Applications Of Personal Situation-Aware Assistants", Computers and Graphics, Pergamon Press LTD., Oxford, GB, vol. 23, No. 6, Dec. 1999, pp. 903-915, XP 004187839, ISSN: 0097-8493.

CommWeb.com "Enterprise Customer Interfaces: Application Messaging Via Instant Messaging" (Dec. 9, 2002), available at http://www.commweb.com/article/COM20021209S0001/2, 3 pages.

CosmoCall Universe™, "The Carrier-Grade, All-IP Contact Center Platform for Next Generation Network-Based Services" (2002) 3 pages.

CosmoCall Universe™, "The Next Generation IP Contact Center Platform", available at http://www.cosmocom.com/ProductInfo/Product.htm, 18 pages, 1997-2003.

Crocker et al. "Common Presence and Instant Messaging (CPIM)," Network Working Group (Aug. 14, 2002), available at http://www.ietf.internet-drafts/draft-ietf-impp-cpim-03.txt, 33 pages.

Dawson et al.; "Vcard MIME Directory Profile," Network Working Group (Sep. 1998), available at http://www.ietf.org/rfc/rfc2426.txt?number=2426, 40 pages.

Day et al. "A Model for Presence and Instant Messaging," Network Working Group (Feb. 2000), available at http://www.ietf.org/rfc/rfc2277.txt?number=2778, 16 pages.

Day et al.; "Instant Messaging/Presence Protocol Requirements," Network Working Group (Feb. 2000), available at http://www.ietf.org/rfc/rfc2779.txt?number=2779, 25 pages.

e-Vantage Solutions, "Customer Service Window", available at http://www.evgl.com/dsw.html, 2 pages, 2003.

FaceTime Communications Press Release, "Amica Insurance selects FaceTime Communications to Provide Instant Messaging-Based Customer Service in Enterprise" (Jun. 25, 2001), Available at http://www.facetime.com/pr/pr010625.shtm, 2 pages.

FaceTime Communications website, "Customer Services", available at http://www.facetime.com/custsvcs.shtm, 4 pages, 2003.

FaceTime Communications website, "Overview", available at http://www.facetime.com/solutions.shtm, 4 pages, 2003.

FaceTime Communications website, "Presence Management", available at http://www.facetime.com/presence.shtm, 3 pages, 2003.

Fielding et al.; "Hypertext Transfer Protocol—HTTP/1.1," Network Working Group, Request for Comments 2068 (Jan. 1997), 152 pages.

G. Klyne et al,, "Instant Messaging using APEX", Network Working Group, Jun. 1, 2001, 19 pages.

G. Klyne; "A Syntax for Describing Media Feature Sets," Network Working Group (Mar. 1999), available at http://www.ietf.org/rfc/rfc2533.txt?number=2533, 35 pages.

G. Klyne; "Protocol-independent Content Negotiation Framework," Network Working Group (Sep. 1999), available at http://www.ietf.org/rfc/rfc2703.txt?number=2703, 19 pages.

Grigonis, Computer Technology Encyclopedia (2000) pp. 342-345, 389-392.

Gulbrandsen et al.; "A DNS RR for Specifying the Location of Services (DNS SRV)," Network Working Group (Feb. 2000), available at http://www.ietf.org/rfc/rfc2782.txt?number=2782, 12 pages.

Holtman et al.; "HTTP Remote Variant Selection Algorithm—RVSA/1.0," Network Working Group (Mar. 1998), available at http://www.ietf.org/rfc/rfc2296.txt?number=2296, 13 pages.

Holtman et al.; "Transparent Content Negotiation in HTTP," Network Working Group (Mar. 1998), available at http://www.ietf.org/rfc/rfc2295.txt?number=2295, 55 pages.

J. Rosenberg et al., "SIP extensions for Instant Messaging", Internet Engineering Task Force, Jul. 18, 2001, 22 pages.

Live2Support, "Features", Available at http://web.archive.org/web/20040206215142/www.live2support.com/features_live_chat.php>, undated, 4 pages.

"MIT Project Oxygen Publications", 2 pages, undated.

MIT Project Oxygen, "Oxygen: Pervasive, Human-Centered Computing" MIT Laboratory for Computer Science, MIT Artificial Intelligence Laboratory (May 2002).

Ovisoft Technologies, "Ovisoft Messenger—Call Center Solutions", available at http://www.ofisoft.com/solutioncallcenter.htm, 1 page, 2003.

Pervasive, Human-Centered Computing, MIT Project Oxygen, published by MIT Laboratory for Computer Science (May 2002).

Richard Grigonis, Computer Telephony Encyclopedia (2000) pp. 367-375.

Richard Grigonis,. Computer Telephony Encyclopedia (2000) pp. 413-430.

Richard Shockey, 'ENUM: Phone Numbers Meet the Net' www.cConveroence.com (Jul. 2001) pp. 21-30.

Rose et al.. "The APEX Presence Service," Network Working Group (Jan. 14, 2002), available at hftp://www.ieff.org/internet-drafs/draft-ielf-apex-presence-06.txt, 31 pages.

Salvator, Dave, "Review: Skype Voice Chat", Available at http://www.findarticles.com/p/articles/mi_zdext/is_200310/ai_ziff109903>, Extreme Tech, Oct. 2003, 2 pages.

Schulzrinne, H., at al., "The Session Initiation Protocol: Internet-Centric Signaling", IEEE Communications Magazine (Oct. 2000), vol. 38, No. 10, pp. 134-141.

Stephanie Losi, "Instant Messaging for Call Centers Leaves 'Em Smiling" www.CRMDaily.com (Jun. 4, 2001), available at http://www.newsfactor com/perl/story/10246.html, 3 pages.

Steve Taylor et al., "SIP in the call center" Network World Convergence Newsletter (Aug. 27, 2003), available at http://www.nwfusion.com/newsletters/converg/2003/0825converge2.htmp, 4 pages.

Sugano at al, "Common Presence and Instant Messaging (CPIM) Presence Information Data Format," Network Working Group (Dec. 2002), available at http://www.lettorofinternet-drafts/draft-letf-impo-cnim-oidf-07.bct, 26 pages.

The MIT Oxygen Project, Cambridge, MA, Apr. 25-26, 2000.

Trudy Walsh, "Instant messaging boosts service at Texas call center" GCN (Nov. 2001), available at http://www.gcn.com/cgi-bin/udt/im.display.printable?client.id=state2&story.id=16765, 2 pages.

Venus Valley, "Live chat for your website", Available at http://www.pppindia.com/vvchat/shots.htm>, Venus Valley Live Support, 2003, 2 pages.

WiredRed News Release, "WiredRed to Provide Secure Instant Messaging for Eight New Call Center Customers", available at http://www.wiredred.com/news_release_calictr.html, 2 pages, Sep. 28, 2002.

XML-NS. Tim Bray et al., "Namespaces in XML", W3C recommendation: xml-names, Jan. 14, 1999, 12 pages.

"Phone Mail Override for Incoming Calls", IBM Technical Disclosure Bullitin, vol. 37, No. 11, Nov. 1994.

"CallWave Launches Mobile Call Screening and Mobile Call Transfer for Cell Phones; First Network-Independent VoIP Application to Deliver wireless/Wireline Convergence"; Callwave, Inc.; Internet Article printed from http://investor.callwave.com/phoenix.zhtml?c=180005&p=irol-newsArticle_print&ID=651; Dec. 7, 2004; 2 pages.

Moran et al., "Requirements for Presence Specific Event Notification Filters," http://www.tools.ietf.org/html/draft-moran-simple-pres-filter-reqs-OO, Jan. 2003, 9 pages.

U.S. Appl. No. 12/566,436, filed Sep. 24, 2009, Zmolek.

\* cited by examiner

CALLER INITIATED UNDIVERT FROM VOICEMAIL

FIELD OF THE INVENTION

An exemplary embodiment of the present invention is directed toward telephony devices, services and methods, and more specifically, to allow a caller that has been diverted to voicemail the option of being put through to the callee, should the callee become available while the caller is leaving a message.

BACKGROUND

Voicemail systems have been around for a number of years. Traditional voicemail systems have generally been centered around an answering machine that may or may not be collocated with a caller. The voicemail systems can be analog or digital, and may also be a service offered by a carrier. Some of these answering machines allow a callee to intercept the caller while the caller is leaving a message on the machine.

More advanced voicemail systems allow enhanced functionality above and beyond simple "play" and "delete" functions. For example, this enhanced functionality can include fast forward, fast forward to end of message, faster playback, slower playback, repeat, envelope information, message skipping, replying to the message, calling back the caller who left the message, saving the message, forwarding the message, receive notification services, downloading of message (s), personal greeting and options menus, etc.

Callwave® provides an Internet based answering machine that is capable of receiving calls while online. The Caller ID and Caller Name features of Callwave® enable the user to view the name of the person calling while the callee is online. Before a callee hears a caller's message, the callee will see the caller's name and telephone number displayed in a window in the Callwave® interface. Thus, the callee is aware of who called even if the caller does not leave a message.

SUMMARY

Call Waiting allows a callee to switch between calls. Should the callee choose, and upon notification that there is a call waiting, the callee can interrupt a current call and flash over to speak with the incoming call that is in a "call waiting" state. This toggling between an active call and a call waiting call can occur at the callee's discretion.

In existing voicemail systems, once a voicemail is received, it is the onus of the recipient of the voicemail message to call the caller back when a "missed call" message is received on the phone or after the voicemail message is retrieved. While some of the more advanced voicemail systems provide the capability of automatically placing a call back to the caller upon completion of the voicemail message, an exemplary embodiment of the present invention allows the caller, automatically or at the caller's election, to be connected to the callee should the callee become available while the caller is leaving a voicemail message.

For example, and from the perspective of the involved parties, the flow between a caller and a callee would be as follows. The caller calls the callee but the callee is unavailable as, for example, they are on another call. Thus, the caller is diverted to voicemail. While the caller is leaving a message, the callee becomes available, i.e., they end their call. The caller is informed, e.g., by an armouncement being played, that the callee is now available and is given the option of connecting to the callee or continuing to leave the message.

In accordance with an exemplary embodiment, there could also be communication between a PBX and a voicemail system to send notification messages regarding the callee's state to the caller and to handle the re-termination of the call to the callee. For example, a PBX could receive a call from the caller and, upon finding the callee to be unavailable, connect the caller to voicemail. The PBX continues to monitor the availability of the callee until the PBX receives a message from the voicemail system indicating that the caller has completed their message and terminated the call.

If the PBX detects that the callee has become available and the caller is still connected to the voicemail system, the PBX can signal the voicemail system with this information. The voicemail system could then audibly or through some other indication or message notify the caller that the callee is available. If the caller signals to the voicemail system that they would like to be put through to the callee, then the appropriate network components would transfer the call back to the PBX which would in turn the ring the callee's phone.

A Session Initiation Protocol (SIP) is a signaling protocol that can be used for establishing sessions in an IP network. The session can be a simple two-way telephone call or, for example, could be a multi-party, multi-media conference session. SIP protocols are well known and allow the ability to establish sessions in a host of different service options such as voice-enriched e-commerce, web page click-to-dial, instant messaging, IP Centrex services and the like. An exemplary embodiment of the systems and methods of this invention could use SIP protocols to implement the functionality and messaging described herein. Additionally, the determination as to whether a callee is available need not be limited to the identification of a busy signal, but could also be based on presence information or "do not disturb" status information available to, for example, a PBX.

An exemplary aspect of the invention is related to call redirection.

More specifically, an exemplary aspect of the invention relates to reconnecting a previously terminated call once a callee becomes available.

Aspects of the invention further relate to allowing a caller that has been diverted to voicemail an option of being put through to the callee when the callee becomes available.

Still further aspects of the invention relate to redirecting a caller to a callee upon a determination being made that the callee is available.

These and other features and advantages of this invention are described in, or are apparent from, the following detailed description of the exemplary embodiments. The embodiments and configurations herein are neither complete nor exhaustive. As will be appreciated, other embodiments of the invention are possible utilizing, alone or in combination, one or more of the features set forth above or described in detail below.

BRIEF DESCRIPTION OF THE DRAWINGS

The exemplary embodiments of the invention will be described in detail, with reference to the following figures wherein.

DETAILED DESCRIPTION

The exemplary embodiments of this invention will be described in relation to caller initiated undivert from voicemail. However, it should be appreciated, that in general, the systems and methods of this invention will work equally well for any type of communication system in any environment.

The exemplary systems and methods of this invention will also be described in relation to telecommunications systems and associated communication hardware, software and communication channels. However, to avoid unnecessarily obscuring the present invention, the following description omits well-known structures, network components and devices that may be shown in block diagram form, are well known or are otherwise summarized.

For purposes of explanation, numerous details are set forth in order to provide a thorough understanding of the present invention. It should be appreciated however that the present invention may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a telecommunications network and/or the Internet, or within a dedicated secure, unsecured and/or encrypted system. Thus, it should be appreciated that the components of the system can be combined into one or more devices, such as a PBX or voicemail system, or collocated on a particular node of a distributed network, such as an analog and/or digital telecommunications network, a circuit switched network and/or a packet switched network. As will be appreciated from the following description, and for reasons of computational efficiency, the components of the system can be arranged at any location within a distributed network without affecting the operation of the system. For example, the various components can be located in a PBX, at one or more users' premises, or some combination thereof. Similarly, one or more functional portions of the system could be distributed between a telecommunications device(s) and an associated computing device.

Furthermore, Session Initiation Protocol or SIP (which is a simple signaling/application layer protocol for data network multimedia conferencing and telephony) can at least be used with the present invention to provide a degree of presence awareness in the communication network. Although other protocols are equally supportive of presence concepts, SIP provides an illustrative basis for the present invention.

In SIP, end systems and proxy servers can provide services such as call forwarding, callee and caller number delivery (where numbers can be any naming scheme such as a conventional URL format), personal mobility (the ability to reach a callee under a single, location-independent address even when the callee changes terminals), terminal-type negotiation and selection (e.g., a caller can be given a choice on how to reach the callee), mobile phone answering service, terminal capability negotiation, caller and callee authentication, blind and supervised call transfer, and invitations to multicast conferences.

To provide these varied services, SIP uses a relatively simple message system, namely an "INVITE" message (with the caller's codec preferences) and an "OK" message (with the callee's codec preferences), and various software entities, namely registrars which maintain a map of the addresses of a given user at the current time, proxies which perform call routing, session management, user authentication, redirect functions, and routing to media gateways, redirect servers which perform a subset of forwarding functions, and SIP location servers which maintain user profiles and provide subscriber registration. "Registration" is a mechanism whereby a user's communication device registers with the network each time he or she comes online and individual profiles are accessed that specify information for routing based on a number of different criteria.

It should also be appreciated that the various links, including communications channel and the various links 5, connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique. Further, it is to be noted that the term "a" or "an" entity refers to one or more of that entity. As such, the terms "a" (or "an"), "one or more" and "at least one" can be used interchangeably herein. It is also to be noted that the terms "comprising", "including" and "having" can be used interchangeably.

Also, while the flowcharts have been discussed in relation to a particular sequence of events, it should be appreciated that changes, additions and omissions to this sequence can occur without materially effecting the operation of the invention.

Figure 1:
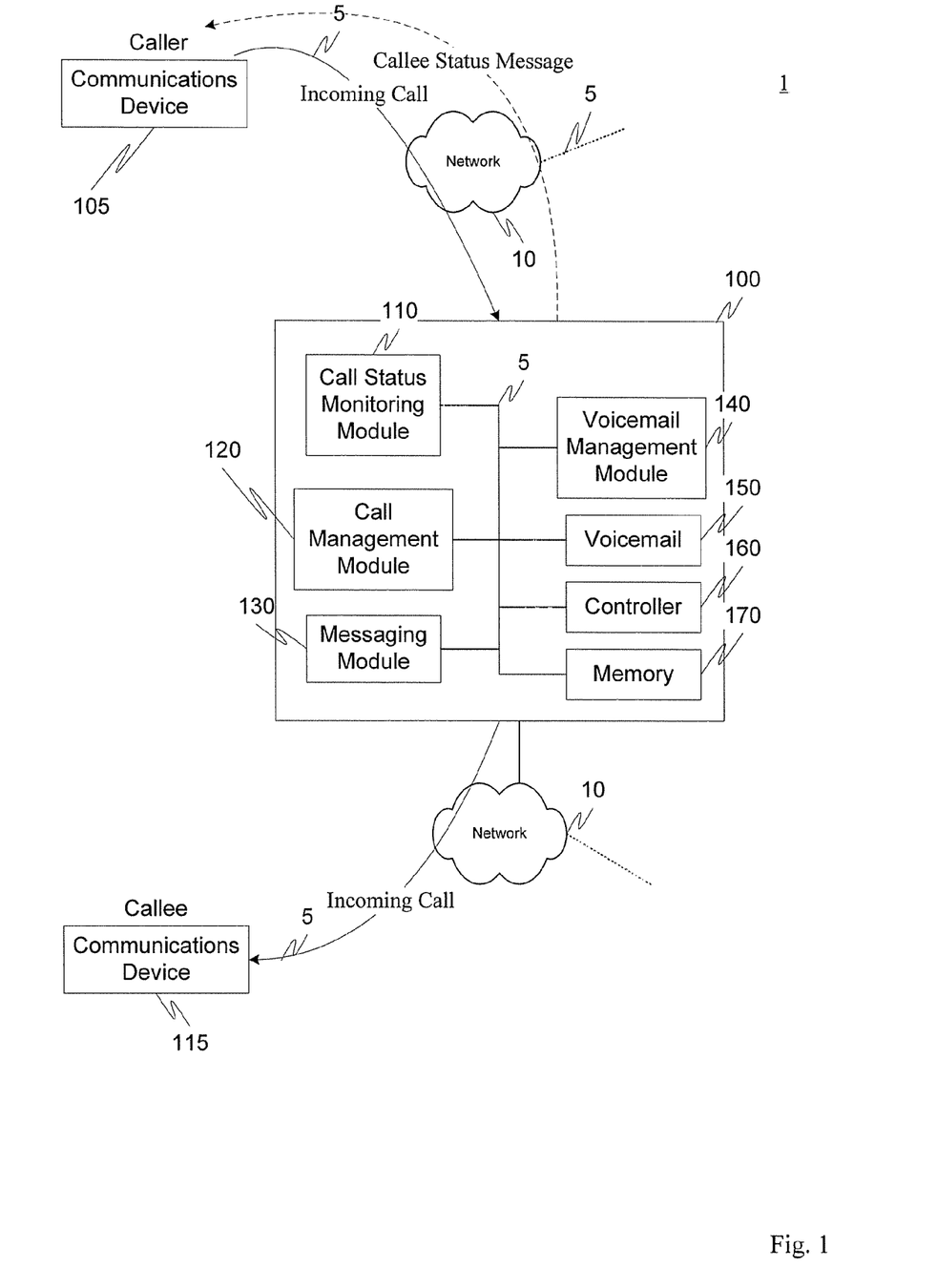
FIG. 1 is a block diagram illustrating an exemplary embodiment of a voicemail redirect system according this invention.

FIG. 1 illustrates an exemplary embodiment of the voicemail redirect system 1. The voicemail redirect system 1 comprises a portion of a telecommunications system 100 connected via links 5 and networks 10 to a communications device 105 at a caller and a communications device 115 at a callee. The portion of the telecommunications system 100 comprises a call status monitoring module 110, a call management module 120, a messaging module 130, a voicemail management module 140, voicemail 150, controller 160 and memory 170, all interconnected via link 5.

As will be appreciated, the portion of the telecommunications system 100 comprises other well known components which will not be discussed herein in detail. For example, the portion of the telecommunications system 100 can further include one or more telephony switch/media servers that can be any architecture for directing communications to one or more communication devices. The network 10 can and typically includes proxies, registrars, switches and routers that are well known. The communication devices 105 and 115 can be any communication device suitable for the network to which they are connected. For example, the communications devices can be any wired or wireless phone such as IP hardphones, such as the Cisco 7960™ phone, IP softphones, Personal Digital Assistants or PDAs, Personal Computers or PCs, laptops, mobile phones, traditional PSTN type phones, cellular phones or any combination thereof.

A typical communications device comprises a handset, or headset, and a cradle assembly. The cradle assembly typically comprises a display, a nonprogrammable or hard keypad and programmable or soft keypad.

In operation, a call is originated in communications device 105 by the caller and routed, with the cooperation of network 10 and various portions of the telecommunications system 100 such as controller 160 and memory 170, to the communications device 115 possessed by the callee. The call management module 120 monitors the status of the incoming call's connection to communications device 115. Upon determining that the communications device 115 is busy, or otherwise not available, the call management module 120 in cooperation with the voicemail management module 140, forwards the incoming call from the caller for the callee to voicemail 150.

The voicemail management module 140 and voicemail 150 provide standard, well-known features that allow the caller/callee to navigate the voicemail system. Features such as review message, save message, send message, delete message, skip message, forward message, faster, slower, repeat and the like can be provided as are well known.

While the caller is leaving a voicemail in voicemail 150, which may or may not also be broadcast to the callee, the call status monitoring module 110, in cooperation with the controller 160 and memory 170, monitors the status of the communications device 115. Upon the call status monitoring module 110 determining that the communications device 115 is available, and in cooperation with the messaging module 130 and the voicemail management module 140, the caller is notified that the callee is available. In conjunction with this notification, the voicemail management module 140 and instructs voicemail 150 go into a pause mode until a determination is made by the caller as to whether they would like to connect to the callee.

More specifically, and in cooperation with the messaging module 130, a message is determined and forwarded via network 10 and link 5 to the communications device 105. The caller is prompted, for example, via an audio or other prompt, to select to either connect to the callee, continue the voicemail, or terminate the call.

If the caller elects to connect to the callee, the caller can be prompted as to whether the partially completed voicemail should be deleted. If desired, the caller can select to have the partially completed voicemail deleted and the caller terminated to the callee. Alternatively, the caller can leave the partially completed voicemail in voicemail 150 which will, in due course, be forwarded to the callee at communication device 115. Alternatively still, the partially completed voicemail can be automatically deleted.

If the caller elects to not be connected to the callee, the caller can be returned to voicemail when the caller can complete the voicemail or, alternatively, the call terminated.

Figure 2:
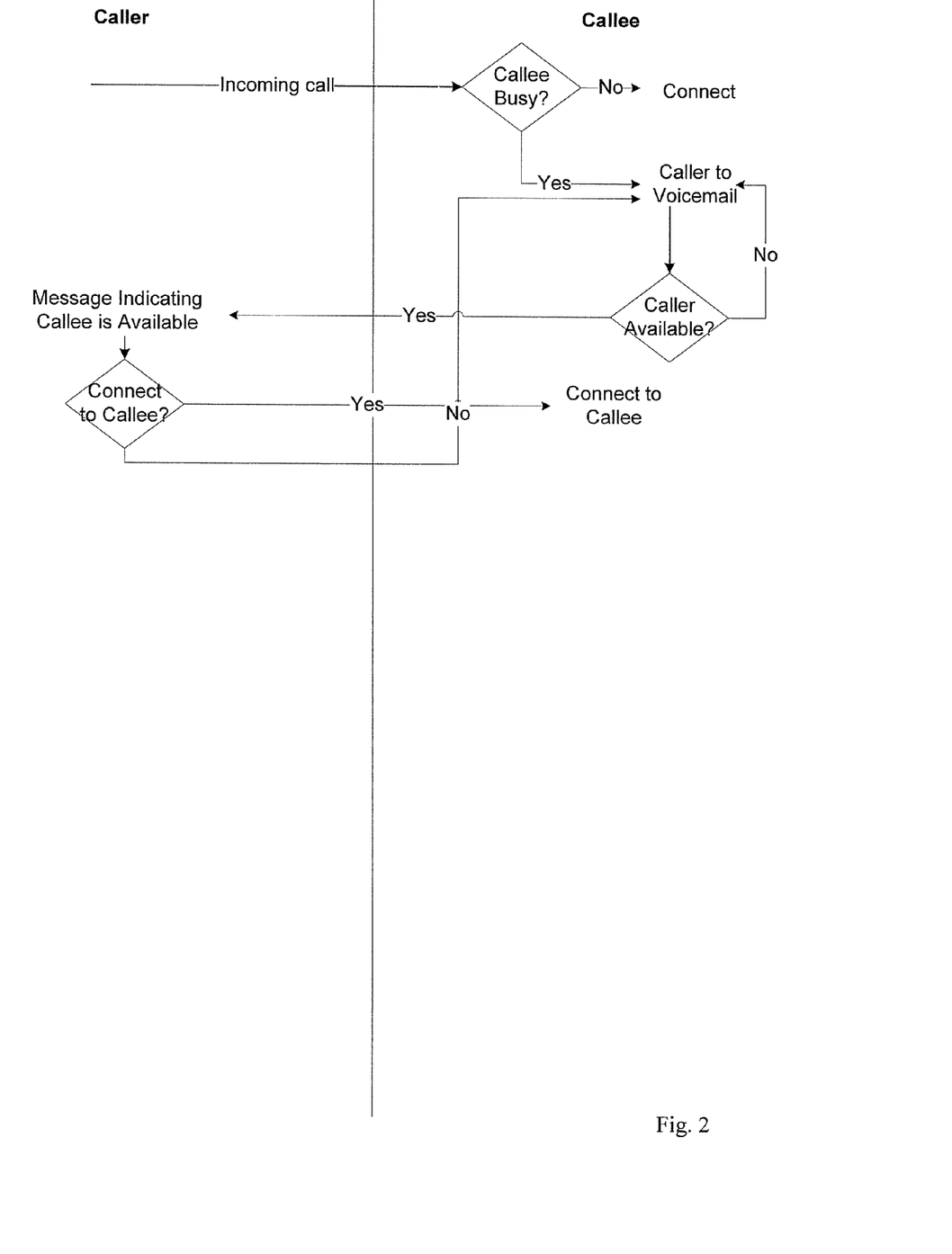
FIG. 2 illustrates exemplary call flow according to an embodiment of this invention.

FIG. 2 illustrates an exemplary call flow associated with an embodiment of this invention. Specifically, the caller places a call to the callee. If the callee is not busy, the caller is connected to the callee. However, if the callee is busy, the caller is diverted to the callee's voicemail. While the caller is in the callee's voicemail, the status of the callee is monitored to detect availability. Should the callee become available during the time when the caller is leaving a voicemail, the caller is given the opportunity to connect with the callee and exit the voicemail system. For example, the caller can be prompted with "Press 1 to connect to callee, Press 2 to continue with voicemail." For example, one or more of the caller and the callee can subscribe to a service that provides the above functionality and, for example, the service can store a profile that defines how, for example, notification, billing, or the like is to occur.

Additionally, or alternatively, the present invention can use presence information to determine the status of the callee and the appropriate termination or diversion of a call. "Presence" relates to the person having multiple devices with multiple communication paths and the user's preference/preferred devices and availability. "Presence information" typically refers to any information associated with a network node and/or endpoint device, such as a communication device, that is in turn associated with a person. Examples of presence information include registration information under the Session Initiation Protocol, information regarding the accessibility of the endpoint device, the endpoint's telephone number or address, the recency of use of the endpoint device by the person, recency of authentication by the person to a network component, and the preferences of the person (e.g., contact mode preferences or profiles such as the communication device to be contacted for specified types of contacts or under specified factual scenarios or presence contexts, contact time preferences, impermissible contact types and/or subjects such as subjects about which the person does not wish to be contacted, permissible contact types and/or subjects such as subjects about which the person does wish to be contacted, parties who must not contact (i.e., do not call if you are calling on behalf of XYZ company), and parties who can contact at any time (e.g., I will accept a call from the head of Company "x" regardless of what I am doing). Presence information can be user configurable, i.e., the user can configure the number and type of communication and message devices with which he or she can be contacted and to define different profiles that define the communication and messaging options presented to the incoming contactor in specified factual situations or sets of facts. By identifying a predefined set of facts, the pertinent profile can be followed to direct the contact to the user preferred device. "Contact" means a connection or request for connection between two or more communication devices. As will be appreciated, the contacts can be of various types and forms, such as voice contacts, e-mail, faxes, instant messages, paging signals, VoIP sessions, chat sessions, video conferences, multimedia multi-part messages, and cross-media messages. Moreover, "Availability intelligence" can be combined with the presence information, wherein "Availability intelligence" refers to processed (e.g., compiled, cross-referenced, and/or filtered) presence information or meta-information. Policy rules associated with the callee's name space can then be mapped against the one or more of the presence information and intelligence information to determine what availability intelligence, if any, is to be provided to a callee.

Figure 3:
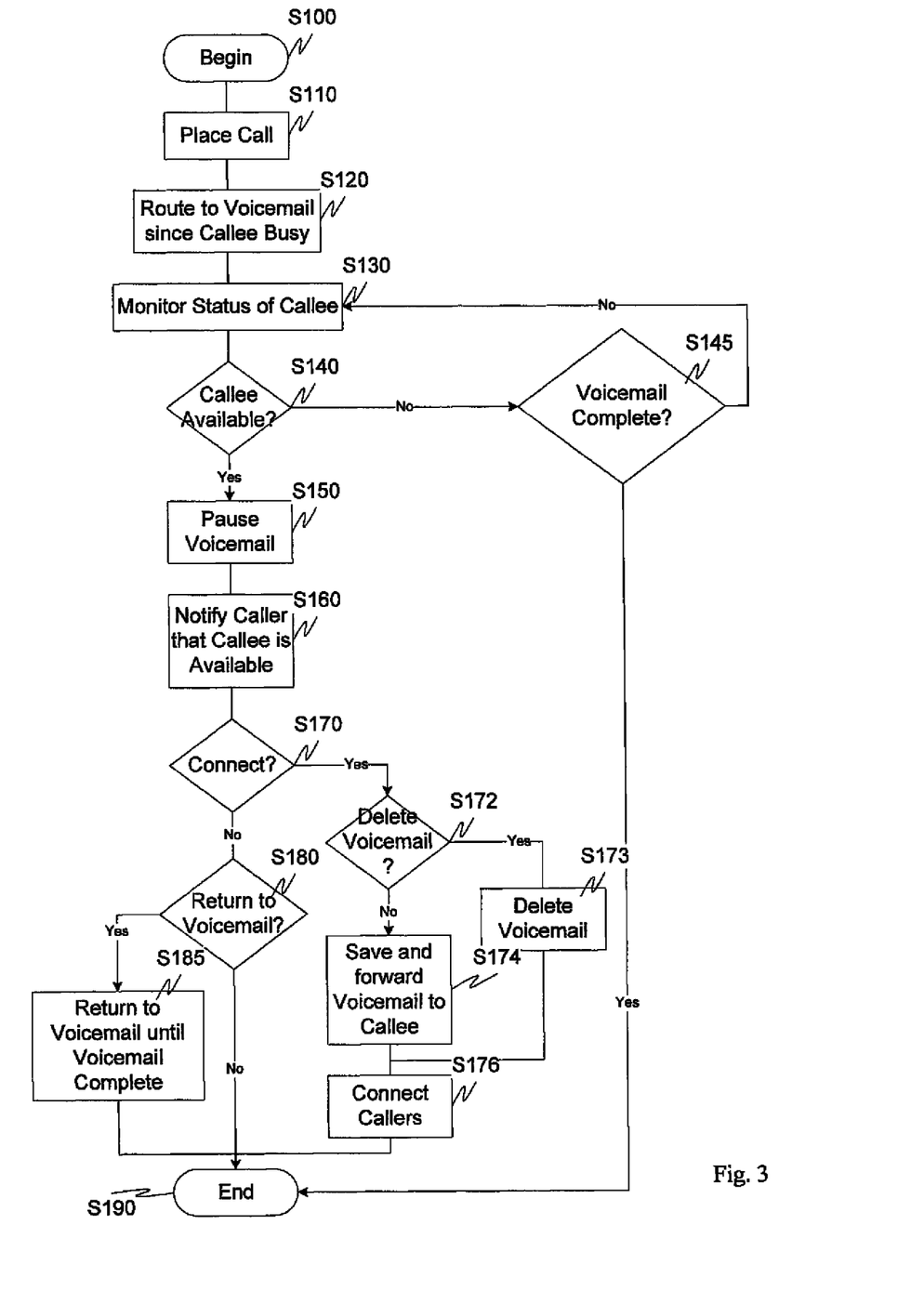
FIG. 3 is a flowchart illustrating an exemplary method of voicemail redirect according to this invention.

FIG. 3 is a flowchart illustrating an exemplary method of the invention. In particular, control begins in step S100 and continues to step S110. In step S110, a caller places a call to the callee. Next, in step S120, the caller is routed to, for example, the callee's voicemail since the callee is busy or otherwise unavailable. For example, the determination that the callee is unavailable can be based on one or more of presence information, a do not disturb status, line conditions, a busy signal, or the like. Alternatively, the caller could be routed to, for example, an interactive voice response system, where the redirecting of the caller to a callee when the callee becomes available would work in the same manner. In general, the caller could be directed to any service while the callee is busy with the systems and methods described herein having the ability to redirect the caller from that service to a callee upon the callee becoming available.

Then, in step S130, and during the caller's communication with the callee, the status of the callee is monitored. Control then continues to step S140.

In step S140, a determination is made whether the callee has become available. If the callee has become available, control continues to step S150. Otherwise, control jumps to step S145.

In step S145, a determination is made whether the caller has completed their voicemail. If the voicemail has not been completed, control jumps back to step S130. Otherwise, control continues to step S190 where the control sequence ends.

In step S150, the caller leaving the voicemail is interrupted and voicemail is paused. Next, in step S160, the caller is notified that the callee is available. For example, the caller can be notified through one or more of an audio message, a visual indicator, vibrating, or an interactive voice response (IVR) type of message. Another example of notifying the caller would be to alter a display on a phone, such as a LCD display, to provide a message to the caller that, for example, the callee's line is no longer busy. The display could also be populated with the appropriate messages and corresponding buttons activated to, for example, allow the caller to "Return to Voicemail," "Connect to Callee," and "Hang-up."

Then, in step as 170, a determination is made whether the caller has elected to connect to the now available callee.

If the caller desires to connect to the callee, control continues to step S172. In step S172, the caller is given the option of deleting the partially completed voicemail. If the caller elects to delete the voicemail, the voicemail is deleted in step S173 with control continuing to S176. Otherwise, the caller can save the voicemail which will be forwarded to the callee in step S174. Control then continues to step S176 where the caller and callee are connected.

If the caller decides not to connect to the now-available callee, control continues to step S180. In step S180, the caller is queried whether they would like to return to voicemail or to terminate the call. If the call is to be terminated, control continues to step S190 were the control sequence ends.

However, if the caller elects to return voicemail, control continues to step S185 where the caller is returned to voicemail until the voicemail is completed. Control then continues to step S190 were the control sequence ends.

While the above-described flowcharts have been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The above-described system can be implemented on wired and/or wireless telecommunications devices, such a telephone, mobile phone, PDA, a wired and/or wireless wide/local area network system, a satellite communication system, or the like, or on a separate programmed general purpose computer having a communications device(s) or in conjunction with any compatible communications protocol(s).

Additionally, the systems, methods and protocols of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a phone, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems and methods for caller redirect. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

The invention claimed is:

1. A call diversion method comprising:
   monitoring a status of a communications device while a caller is connected to voicemail;
   while the caller is connected to voicemail, determining that the communications device which was previously unavailable is now available;
   providing an indicator to the caller upon determining that the communications device which was previously unavailable is available;
   prompting the caller, via an audio or other prompt, to select to either connect to the communications device, continue in voicemail, or terminate the call; and
   based on a response to the prompting:
      redirecting the call from voicemail to the now available communications device,
      continuing in voicemail, or
      terminating the call.

2. The method of claim 1, further comprising one or more of:
   forwarding the call to voicemail when the communications device is unavailable,
   determining presence information associated with a person associated with the communications device, and
   combining availability intelligence with the presence.

3. The method of claim 1, further comprising prompting the caller to connect to the communications device when the communications device becomes available.

4. The method of claim 3, further comprising returning the call to voicemail when the caller elects to not be connected to the available communications device.

5. The method of claim 1, further comprising prompting a caller to delete a partially completed voicemail.

6. The method of claim 1, further comprising:
forwarding an indication to a caller when the communications device becomes available; and
performing an action based on a response received from the caller.

7. The method of claim 1, further comprising pausing voicemail during a time period when the caller is being queried to connect to the available communications device.

8. The method of claim 1, further comprising providing one or more of an audio, interactive voice response (IVR) or visual indicator to a caller upon determining that the communications device which was previously unavailable is available.

9. A call diversion system comprising:
a call status monitoring module configured to monitor a status of a communications device while a caller is connected to voicemail, determine that the communications device which was previously unavailable is now available, provide an indicator to the caller upon determining that the communications device which was previously unavailable is available, prompt the caller, via an audio or other prompt, to select to either connect to the communications device, continue in voicemail, or terminate the call; and based on a response to the prompting:
a call management module is configured to:
redirect the call from voicemail to the now available communications device
continue the voicemail, or
terminate the call.

10. The system of claim 9, further comprising a voicemail management module configured to:
cooperate with the call management module to forward the call to voicemail when the communications device is unavailable,
determine presence information associated with a person associated with the communications device, or
combine availability intelligence with the presence.

11. The system of claim 9, further comprising a messaging module configured to prompt the caller to connect to the communications device when the communications device becomes available.

12. The system of claim 11, wherein the call management module returns the call to voicemail when the caller elects to not be connected to the available communications device.

13. The system of claim 9, further comprising a messaging module configured to cooperate with a voicemail management module to prompt the caller to delete a partially completed voicemail.

14. The system of claim 9, further comprising:
a messaging module configured to forward an indication to the caller when the communications device becomes available and to cooperate with the call management module to perform an action based on a response received from the caller.

15. The system of claim 9, wherein the voicemail management module pauses voicemail during a time period when the caller is being queried to connect to the available communications device.

16. The system of claim 9, further comprising providing one or more of an audio or visual indicator to the caller upon determining that the communications device which was previously unavailable is available.

17. A call diversion architecture comprising:
means for monitoring a status of a communications device while a call is in voicemail;
means for determining that the communications device which was previously unavailable is available;
means for providing an indicator to a caller upon determining that the communications device which was previously unavailable is available;
means for prompting the caller, via an audio or other prompt, to select to either connect to the communications device, continue in voicemail, or terminate the call; and
based on a response to the prompting:
means for redirecting the call from voicemail to the now available communications device,
means for continuing in voicemail, or
means for terminating the call.

18. The architecture of claim 17, further comprising one or more of:
means for forwarding the call to voicemail when the communications device is unavailable,
means for determining presence information associated with a person associated with the communications device, and
means for combining availability intelligence with the presence.

19. The architecture of claim 17, further comprising means for prompting the caller to connect to the communications device when the communications device becomes available.

20. The architecture of claim 19, further comprising means for returning the call to voicemail when the caller elects to not be connected to the available communications device.

21. The architecture of claim 17, further comprising means for prompting the caller to delete a partially completed voicemail.

22. The architecture of claim 17, further comprising:
means for forwarding an indication to the caller when the communications device becomes available; and
means for performing an action based on a response received from the caller.

23. The architecture of claim 17, further comprising means for pausing voicemail during a time period when the caller is being queried to connect to the available communications device.

24. The architecture of claim 17, further comprising means for providing one or more of an audio or visual indicator to a caller upon determining that the communications device which was previously unavailable is available.

25. A call routing protocol comprising:
determining a status of a callee communications device;
routing a call to voicemail when the communications device is not available;
monitoring the status of the communications device while the call is in voicemail;
providing an indicator to a caller upon determining that the communications device which was previously unavailable is available;
prompting the caller, via an audio or other prompt, to select to either connect to the communications device, continue in voicemail, or terminate the call; and
based on a response to the prompting:
terminating the call to the communications device when the communications device becomes available,
continuing in voicemail, or
terminating the call.

26. The protocol of claim 25, further comprising one or more of:

providing the caller with one or more options for voicemail management,
determining presence information associated with a person associated with the communications device, and
combining availability intelligence with the presence.

* * * * *